United States Patent [19]

Corella

[11] Patent Number: 5,046,529
[45] Date of Patent: Sep. 10, 1991

[54] POTABLE WATER STORAGE SYSTEM

[76] Inventor: Arthur P. Corella, 8166 Vanscoy Ave., North Hollywood, Calif. 91602

[21] Appl. No.: 565,675

[22] Filed: Aug. 10, 1990

[51] Int. Cl.$^5$ .............................................. E03B 11/02
[52] U.S. Cl. ................................ 137/590.5; 137/592; 137/216.1; 137/587
[58] Field of Search ............... 137/216, 376, 587, 588, 137/590, 592, 357, 216.1, 590.5, 591, 583

[56] References Cited

U.S. PATENT DOCUMENTS

| | | | |
|---|---|---|---|
| 933,279 | 9/1909 | Welch | 137/216.1 |
| 2,123,809 | 7/1938 | Seitz | 137/592 |
| 2,311,177 | 2/1943 | Johnson | 137/588 |
| 2,536,492 | 1/1951 | Dunn et al. | 137/376 X |
| 2,931,382 | 4/1960 | Cirillo | 137/357 |
| 2,970,610 | 2/1961 | Johnston, Jr. | 137/592 |
| 3,081,603 | 3/1963 | Schmanke, Jr. et al. | 137/376 X |
| 3,095,893 | 7/1963 | Martin | 137/592 X |
| 3,102,799 | 9/1963 | Kiekhaefer | 137/593 X |
| 3,155,106 | 11/1964 | Baron | 137/216 |
| 3,346,000 | 10/1967 | Cushing | 137/216 |
| 4,700,734 | 10/1987 | McCauley | 137/590.5 X |
| 4,718,452 | 1/1988 | Maitland | 137/592 |
| 4,962,789 | 10/1990 | Benscoter | 137/592 X |

Primary Examiner—John Rivell
Attorney, Agent, or Firm—Donald Diamond

[57] ABSTRACT

A potable water storage system includes a water container having a top and a bottom, an inlet flow line passing through the container and having one end terminating near the bottom and an opposite end being connectable to a main supply of water, an outlet flow line passing through the container and having one end terminating near the top and an opposite end connectable to an exchanger hose line, and a tap disposed in the container near the bottom for releasing water from the container.

15 Claims, 1 Drawing Sheet

POTABLE WATER STORAGE SYSTEM

BACKGROUND OF THE INVENTION

1. Field of the Invention

The present invention relates generally to water storage systems and, more specifically, to a potable water storage system providing an emergency supply of water for household use in the event that the main supply of water to the house is cut off.

2. Description of the Related Art

In the event of an earthquake, or in the event of a prolonged power outage, household water supply may be disrupted for hours or perhaps days. When the normal supply of drinking water has been cut off for whatever reason, people have been known to tap hot water heaters for an emergency supply of drinking water. While the hot water heater is capable of supplying drinking water in an emergency situation, water from the hot water heater is not always very fresh and thus may not have a good taste. Also, the hot water heater is usually difficult to gain access to and difficult to tap, since a drain of the hot water heater may be covered by cover plates or may be close to the floor so that containers cannot be placed under the drain for filling.

In preparation for emergency situations, some people store water in large containers, but since the emergency events which lead to loss of power or loss of the main water supply infrequently occur, water stored in conventional containers will likely become stale and undrinkable over time.

A need exists for an emergency water storage system which is capable of supplying fresh water of a quality suitable for drinking.

SUMMARY OF THE INVENTION

An object of the present invention is to provide a potable water storage system which is capable of supplying fresh water for a limited amount of time during an emergency water-interrupting event, until such time as a main supply of water can be restored.

Another object of the present invention is to provide a potable water storage system which is passive, in that it requires no electricity to operate.

Another object of the present invention is to provide a potable water storage system which is simple to operate and cost effective to produce.

Another object of the present invention is to provide a potable water storage system which is provided with means for exchanging the water contained therein after initial filling so as to maintain a fresh supply therein.

In a preferred embodiment of the invention, a potable water storage system includes a water container having a top and a bottom, an inlet flow line passing through the container and having one end terminating near the bottom and an opposite end being connectable to a main supply of water, an outlet flow line passing through the container and having one end terminating near the top and an opposite end connectable to an exchanger hose line, and a tap disposed in the container near the bottom for releasing water from the container.

These and other features and advantages of the potable water storage system of the present invention will become more apparent with reference to the following detailed description and drawings.

DETAILED DESCRIPTION OF THE PREFERRED EMBODIMENTS

Figure 1:
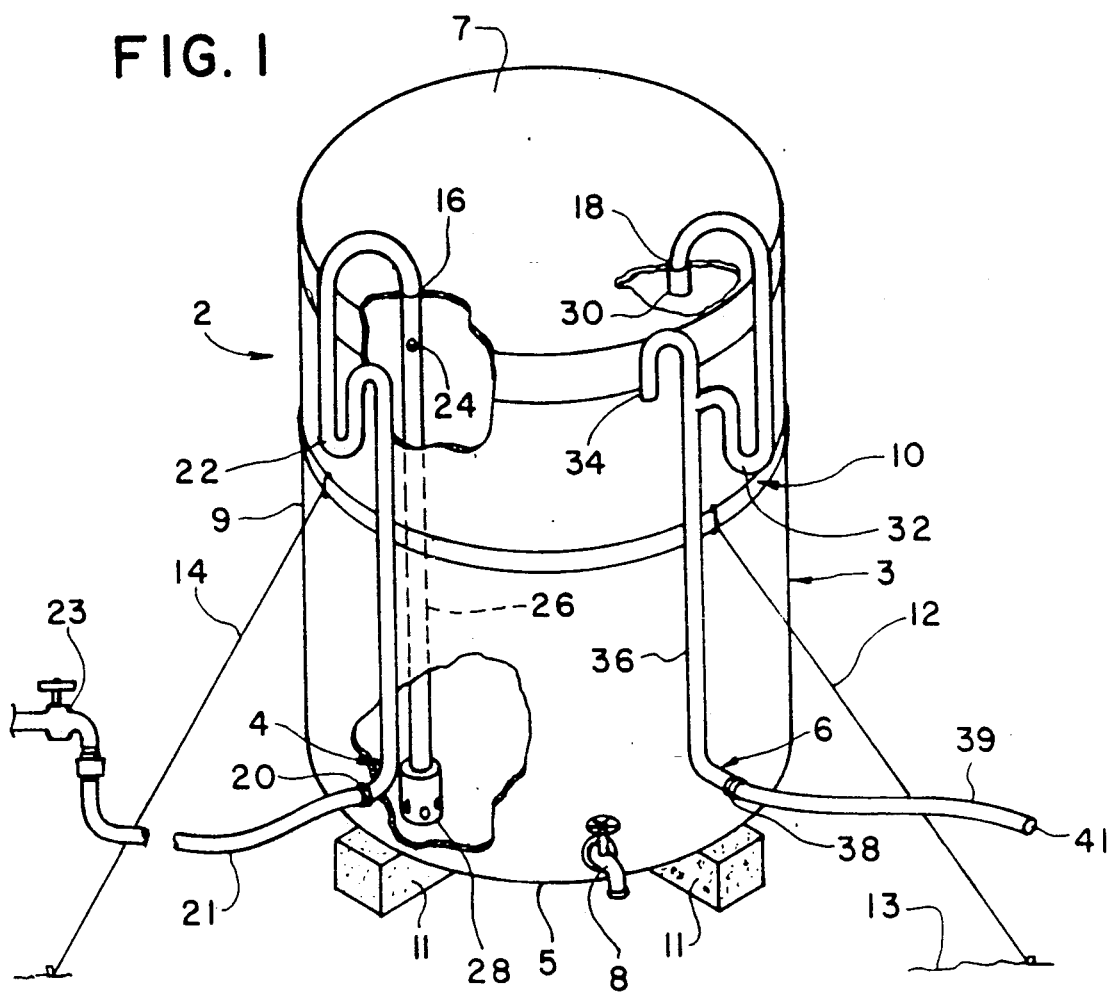
FIG. 1 is a perspective view of a preferred embodiment of the potable water storage system according to the present invention.

Referring now to the drawings, a potable water storage system according to the present invention is generally referred to by the numeral 2 and includes a water storage container 3 which is preferably a unitary structure fabricated from high density polyethylene, wherein the bottom 5 and the top 7 are integrally formed with a cylindrical side wall 9. Alternatively, the top 7 can be removable as a separate part which may be attached by screw threads or other suitable means.

An inlet flow line 4 is used for filling the container 3, and an outlet flow line 6 is used for indicating when the container is full and for exchanging water in the container, as will be described in greater detail below. A tap 8 is disposed near the bottom 5 of the container 3 and is used to either drain the container or to fill smaller containers, such as pitchers, when an emergency supply of drinking water contained therein is needed.

A strap 10 is disposed circumferentially around the container 3 and is coupled to a plurality of tiedown cables 12 and 14 which are used to secure the container in a stable, upright position on a stand 11. The stand may be simply masonary blocks placed on a surface 13, for example.

The top 7 of the container 3 is provided with holes 16 and 18 through which corresponding portions of the inlet flow line 4 and the outlet flow line 6 pass, respectively.

The inlet flow line 4 includes a female hose coupling 20 for connection to a garden hose 21 which is connected at its opposite end to a spigot 23 which is an outlet for the main supply of water to, for example, a dwelling.

A trap 22 is formed in an upper portion of the inlet flow line 4 and provides a water seal for the inlet flow line 4. At the top 7 of the container 3, the inlet flow line 4 passes through the opening 16 and is sealingly engaged with the top so as to make an air-tight fitting. From the opening 16, a standpipe 26 extends downwardly into the container 3 and terminates near the bottom in a dispersion valve 28, which is preferably a perforated cap fixedly connected to the lower end of the standpipe 26.

An anti-siphon port 24 is provided in the cylindrical side wall of the standpipe 26 near the upper end of the pipe so as to prevent back-flow of water from within the container out through the inlet flow line 4.

The outlet flow line 6 also has a trap 32 disposed in an upper portion of the line, and the line 6 terminates near the top 7 of the container 3 after passing through the opening 18, so as to protrude slightly into the container 3. The protruding portion provides an inlet 30 for water passing through the outlet line 6. The outlet line 6, as it passes through the opening 18, is also sealed by suitable means so as to make the connection air-tight between the top 7 and the line 6.

A relief port 34, which is open to ambient, is provided at the upper end of a standpipe 36 disposed on the outside of the container 3. The relief port 34 provides an air inlet to the container 3 when it is being drained through the tap 8.

A male hose coupling 38 is formed on the outer end of the outlet line 6 for connection to the threaded end of an exchange water hose 39. The distal end 41 of the exchange water hose 39 is deliberately left with no fittings so that the user cannot attach pressure-building attachments such as a spray nozzle. This is because the potable water storage system according to the present invention is a low pressure system and the exchange water hose 41 should never be constricted. Thus, if the distal end 41 is provided with no coupling, a pressure-building nozzle cannot be accidentally attached to the exchange water hose 39.

In order to implement the system according to the present invention, the container 3 is filled by turning on the spigot 23 and allowing water to pass through the inlet line 4 into the container through the dispersion valve 28. The water level rises within the container 3 until water begins to pass through the inlet 30 of the outlet line 6. When water begins to flow from the exchange water hose 39, the container is full. As the container 3 is filling, air which is displaced by water passes through the outlet flow line 6.

Figure 2:
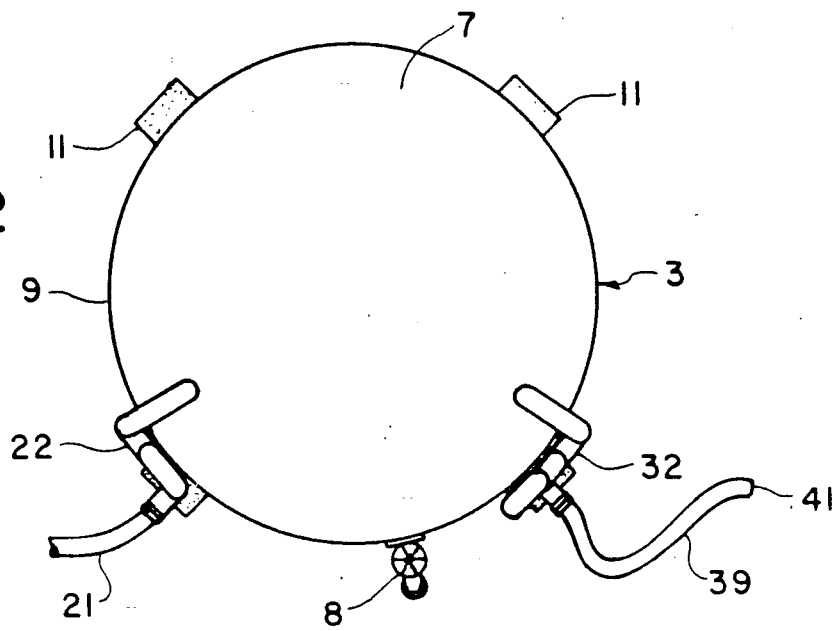
FIG. 2 is a top view of the potable water storage system of FIG. 1.

Since emergency events, such as earthquakes, which lead to a disruption of the main water supply may be infrequent, the system illustrated in FIGS. 1 and 2 is intended to be used as, for example, a watering system for irrigation, such as to water the lawn, plants, etc. through the exchange water hose 39 so that the supply of water within the container 3 is constantly replenished. This prevents the water from within the container from becoming stale and undrinkable. Thus, it is preferable to place the system near an area which will be irrigated regularly so that irrigation can be affected through the system, thereby ensuring that the water stored in the container is fresh. Thus, whenever it is desirable to irrigate, the spigot 23 is turned on and water flows into the container 3 at the bottom through the flow line 4, and out the top through the flow line 6. The arrangement thus described ensures that all of the water within the container is exchanged since the water is forced from the bottom to the top, and no pockets of stale water can form.

When the system is not used for irrigation, and after the container has been filled, the spigot 23 is turned off, and the hose 21 can be removed. In the event that the main supply of water is cut off, drinking water can be obtained through the tap 8. Since the container 3 is preferably about 55 gallons, an adequate supply of drinking water can be maintained for the time that the main supply of water is disrupted, which is usually no more than a few days. When the water is removed through the tap 8, air displaces the water which is removed through the relief port 34.

Numerous and modifications and adaptations of the present invention will be apparent to those so skilled in the art and thus, it is intended by the following claims to cover all such modifications and adaptations which fall within the true spirit and scope of the invention.

What is claimed is:

1. A potable water storage system comprising:
   a water container having a top and bottom;
   an inlet flow line passing through the container and having one end terminating near the bottom and an opposite end being connectable to a main supply of water, wherein the inlet flow line includes a substantially U-shaped trap disposed outside the container for sealing the inlet flow line from ambient;
   an outlet flow line passing through the container and having one end terminating near the top and an opposite end connectable to an exchange hose line and to atmosphere so as to maintain ambient pressure conditions; and
   a tap disposed in the container near the bottom for releasing water from the container.

2. A potable water storage system according to claim 1, wherein the water container is made of a high density polyethylene material.

3. A potable water storage system according to claim 2, wherein the inlet flow line includes a standpipe extending downwardly from the top of the container and terminating near the bottom.

4. A potable water storage system according to claim 3, wherein the standpipe is provided with a anti-siphon device near the top of the container.

5. A potable water storage system according to claim 4, wherein the anti-siphon device is a hole formed in a side wall of the standpipe.

6. A potable water storage system according to claim 5, further comprising a dispersion valve disposed at a lower end of the standpipe.

7. A potable water storage system according to claim 6, wherein the dispersion valve is a perforated cap.

8. A potable water storage system according to claim 3, further comprising a dispersion valve disposed at a lower end of the standpipe.

9. A potable water storage system according to claim 8, wherein the dispersion valve is a perforated cap.

10. A potable water storage system according to claim 1, wherein the outlet flow line includes a U-shaped trap disposed outside the container for sealing the outlet flow line from ambient.

11. A potable water storage system according to claim 10, wherein the outlet flow line includes a relief port disposed above the U-shaped trap, and being open to ambient.

12. A potable water storage system according to claim 11, wherein the outlet flow line includes a standpipe in communication with both the relief port and the U-shaped trap.

13. A potable water storage system according to claim 1, further comprising a stand for supporting the bottom of the container and brace means for supporting the container in a vertical upright position on the stand.

14. A potable water storage system according to claim 1, wherein the inlet flow line and the outlet flow line both include a U-shaped trap for sealing the respective inlet and outlet flow lines from ambient.

15. A potable water storage system according to claim 1, wherein the inlet flow line and the outlet flow line provide filling and exchange means for filling the container with water and exchanging water filled in the tank with fresh water by supplying the container with fresh water from the main supply of water and releasing previously filled water from the tank through the exchanger hose line.

* * * * *